W. C. WALLER.
CUTTING MACHINE.
APPLICATION FILED JUNE 23, 1920.
1,355,021.
Patented Oct. 5, 1920.
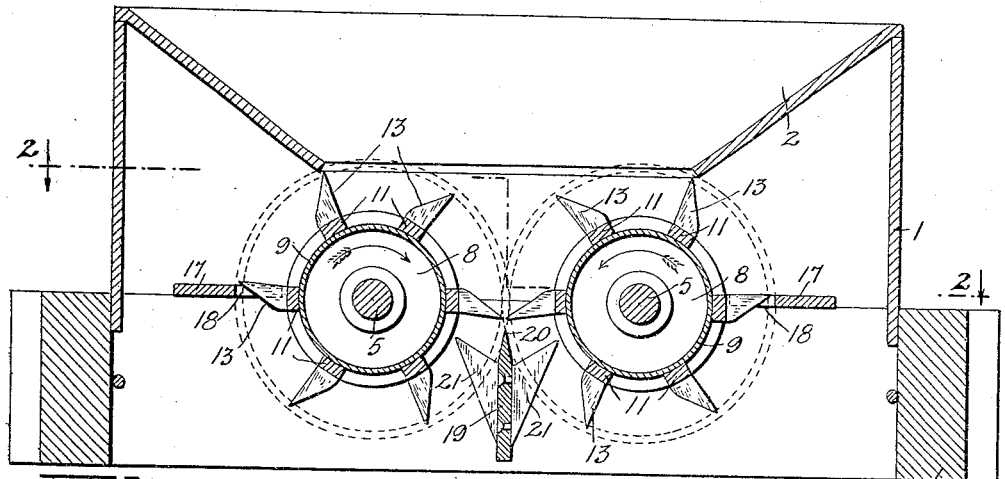
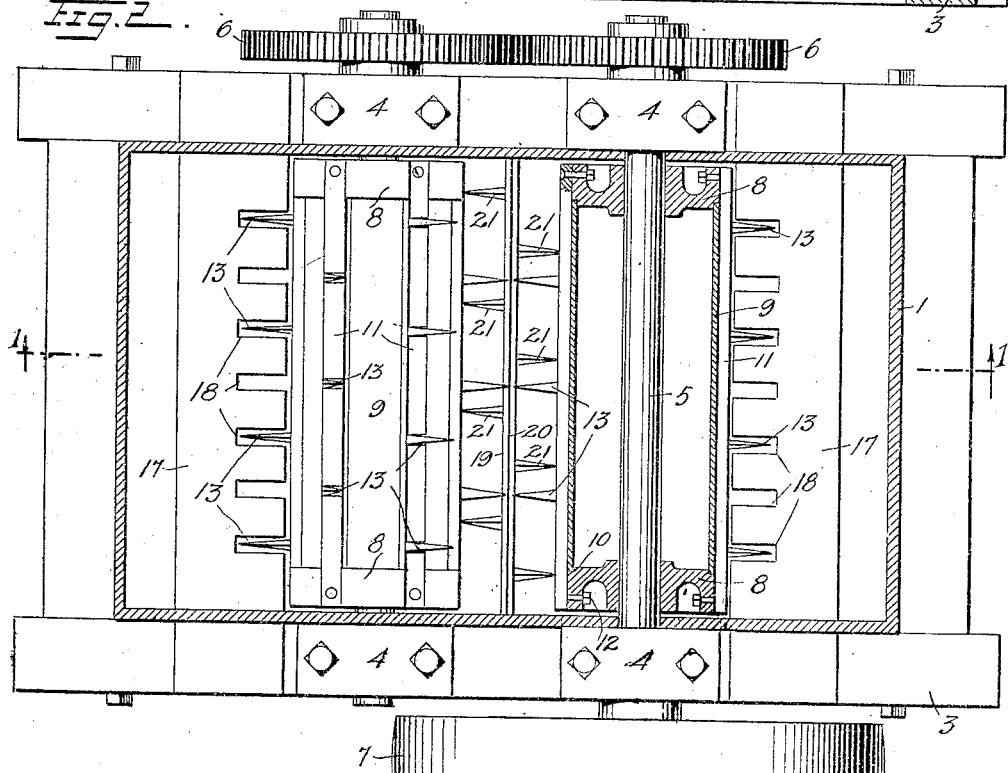
WITNESSES
H. T. Walker
S. W. Foster
INVENTOR
W. C. WALLER
BY
ATTORNEYS

UNITED STATES PATENT OFFICE.

WILLIAM CARR WALLER, OF WIGGINS, MISSISSIPPI.

CUTTING-MACHINE.

1,355,021.  Specification of Letters Patent.  Patented Oct. 5, 1920.

Application filed June 23, 1920. Serial No. 391,057.

*To all whom it may concern:*

Be it known that I, WILLIAM C. WALLER, a citizen of the United States, and a resident of Wiggins, in the county of Stone and State of Mississippi, have invented a new and Improved Cutting-Machine, of which the following is a full, clear, and exact description.

This invention relates to improvements in cutting machines, and more particularly to machines designed for cutting potatoes, an object of the invention being to provide an improved construction and arrangement of rotary drums carrying radially projecting knives and coöperating with a fixed cutter blade having knives at its edges for easily and quickly cutting the potatoes or other articles into sections.

A further object is to provide improved means for mounting the knives on the cylinder and provide improved shapes of knives and blades so as to give efficient results.

With these and other objects in view the invention consists in certain novel features of construction, and combinations and arrangements of parts, as will be more fully hereinafter described and pointed out in the claims.

In the accompanying drawings—

Figure 1 is a view in vertical section on the line 1—1 of Fig. 2 illustrating my improved cutting machine.

Fig. 2 is a view in horizontal section on the line 2—2 of Fig. 1.

Fig. 3 is a detail view illustrating the manner of connecting one of the knives to its supporting bar.

1 represents the casing of my improved machine having a hopper 2 at its upper end and secured to a rigid supporting frame 3 at its lower end. This frame 3 and the hopper 2 are preferably rectangular in cross-section although they may be of any shape desired.

The frame 3 provides alined bearings 4 for a pair of parallel shafts 5, these shafts projecting through the casing 1 and connected by intermeshing gears 6 to compel them to turn together and in opposite directions. A drive pulley 7 is provided on one end of one of the shafts 5 to receive power in any suitable manner.

The shafts 5 have secured thereon and spaced apart circular heads 8 and on these heads 8 cylinders 9 are secured, said cylinders having their ends located in grooves 10 in the heads 8 so that the cylinders lie flush with the outer faces of the heads. A circular series of bars 11 extend longitudinally of the cylinders 9 and are secured at their ends to the heads 8, and I have illustrated bolts 12 as securing means for said bars, although it is obvious that other forms of securing means might be employed.

Each of the bars 11 support a longitudinal series of knives 13, one of these knives and its manner of connection with the bar being illustrated in detail in Fig. 3. Each knife 13 has a relatively straight cutting edge 14 and a tapering or beveled blunt edge 15. Integral studs 16 are formed on the knives and projected through the bars 11 and securely riveted therein as clearly shown in Fig. 3.

Stationary plates or blades 17 extend transversely of the casing 1 and are secured to and supported on the frame 3. These plates 17 have slots 18 in their inner edges through which the knives 13 pass and for convenience of description I shall hereinafter refer to the assemblage of parts consisting of the heads 8, cylinders 9, bars 11 and knives 13 as "cutting drums."

The bars 17 form in effect stripper plates which serve to cleanse the knives 13 as they move upwardly through the slots 18.

A transversely positioned stationary cutting blade 19 is supported in the frame 1 and has its upper cutting edge 20 located on a median line between the cutting drums and as close to the arcs of the circles through which the knives 13 pass as is possible. This stationary cutting blade is provided on both sides with triangularly shaped knives 21 which have a staggered relationship to the knives 13 of the cutting drums.

The operation is as follows: Potatoes or other articles to be cut are dumped into the hopper 2 and fall into position between the cutting drums and as the latter revolve, the knives 13 of said drums will force the potatoes or other articles downwardly into contact with the cutting blade 19 and its knives 21, and the coöperation of said blade and knives will cause the potatoes or other articles to be quickly cut into sections.

The sizes and shapes of the sections will be determined by the number and arrangement of knives and blades, and while I have illustrated a particular arrangement of parts, it is obvious that various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. In a cutting machine, a knife carrying roll comprising a shaft, heads on the shaft having grooves therein, a cylinder having its ends located in said grooves, the outer surface of said cylinder being flush with the edges of said heads, and knife carrying devices secured to said heads.

2. In a cutting machine, a knife carrying roll comprising a shaft, heads on the shaft having grooves therein, a cylinder having its ends located in said grooves, the outer surface of said cylinder being flush with the edges of said heads, and knife carrying devices secured to said heads, said devices comprising longitudinal bars secured to the heads and located against the outer face of the cylinder.

3. A knife carrying roll for cutting machines, comprising a shaft mounted in said machine, a pair of heads carried by the shaft, a cylinder carried by the heads, longitudinal bars carried by the heads and located against the outer face of the cylinder, and a staggered arrangement of radially disposed knives mounted on said bars.

WILLIAM CARR WALLER.